(12) United States Patent
Oh

(10) Patent No.: US 7,594,944 B2
(45) Date of Patent: Sep. 29, 2009

(54) MULTI-CYCLONE DUST SEPARATING APPARATUS

(75) Inventor: Jang-keun Oh, Gwangju (KR)

(73) Assignee: Samsung Gwangju Electronics Co., Ltd., Gwangju (KR)

(*) Notice: Subject to any disclaimer, the term of this patent is extended or adjusted under 35 U.S.C. 154(b) by 571 days.

(21) Appl. No.: 11/406,702

(22) Filed: Apr. 19, 2006

(65) Prior Publication Data

US 2007/0079580 A1    Apr. 12, 2007

Related U.S. Application Data

(60) Provisional application No. 60/725,815, filed on Oct. 12, 2005.

(30) Foreign Application Priority Data

Oct. 28, 2005    (KR)    ............ 10-2005-0102612

(51) Int. Cl.
  *B01D 45/12*    (2006.01)
(52) U.S. Cl. ............. 55/345; 55/337; 55/343; 55/346; 55/349; 55/DIG. 3; 15/353
(58) Field of Classification Search ........ 55/345, 55/459.1, 337, 343, 348, 346, 349, DIG. 3; 15/353

See application file for complete search history.

(56) References Cited

U.S. PATENT DOCUMENTS

| 4,373,228 | A | 2/1983 | Dyson | 15/350 |
| 6,428,589 | B1 | 8/2002 | Bair et al. | 55/318 |
| 6,607,572 | B2 * | 8/2003 | Gammack et al. | 55/343 |
| 6,835,222 | B2 * | 12/2004 | Gammack | 55/345 |
| 6,840,972 | B1 * | 1/2005 | Kim | 55/337 |
| 7,361,200 | B2 * | 4/2008 | Oh et al. | 55/343 |
| 2002/0088209 | A1 | 7/2002 | Stephens et al. | 55/337 |
| 2002/0124538 | A1 | 9/2002 | Oh et al. | 55/426 |
| 2004/0068827 | A1 * | 4/2004 | Dyson | 15/353 |
| 2004/0194250 | A1 * | 10/2004 | Conrad et al. | 15/353 |
| 2005/0050863 | A1 | 3/2005 | Oh | 55/345 |

(Continued)

FOREIGN PATENT DOCUMENTS

DE    102004034015    9/2005

(Continued)

OTHER PUBLICATIONS

European Search Report dated Mar. 14, 2008.

(Continued)

*Primary Examiner*—Duane Smith
*Assistant Examiner*—Dung Bui
(74) *Attorney, Agent, or Firm*—Ohlandt, Greeley, Ruggiero & Perle, L.L.P.

(57) ABSTRACT

A multi-cyclone dust separating apparatus has a main cyclone part comprising one or more cyclones, a sub cyclone part comprising one or more cyclone cones, and arranged in substantially parallel relation with respect to the main cyclone part, and a dust collecting casing provided to surround the main cyclone part and the sub cyclone part, and comprising a dust collecting chamber where dust separated in the main cyclone part and the sub cyclone part is collected. The dust collecting casing has a non-constant radius on the same height from the bottom.

17 Claims, 6 Drawing Sheets

U.S. PATENT DOCUMENTS

| | | | | |
|---|---|---|---|---|
| 2005/0251951 | A1* | 11/2005 | Oh et al. | 15/353 |
| 2005/0252180 | A1* | 11/2005 | Oh et al. | 55/345 |
| 2006/0090428 | A1* | 5/2006 | Park et al. | 55/337 |
| 2006/0107629 | A1* | 5/2006 | Oh | 55/345 |
| 2006/0123590 | A1* | 6/2006 | Fester et al. | 15/353 |
| 2006/0230718 | A1* | 10/2006 | Han et al. | 55/345 |
| 2007/0079579 | A1* | 4/2007 | Eddington et al. | 55/337 |

FOREIGN PATENT DOCUMENTS

| | | |
|---|---|---|
| FR | 2 865 919 | 8/2005 |
| KR | 1020020064132 | 8/2002 |
| KR | 10-2005-0109199 | 11/2005 |
| WO | WO02/067755 | 9/2002 |
| WO | WO02/067756 | 9/2002 |

OTHER PUBLICATIONS

Korean Official Action dated Aug. 25, 2006 issued in connection to corresponding Korean Patent Application No. 2005-102612 filed on Oct. 28, 2005.

Office Action dated Jul. 3, 2007 from corresponding Russian Patent Application No. 2006120286.

Russian Office Action dated Jul. 10, 2007 corresponding to Russian Patent Application No. 2006118849.

* cited by examiner

MULTI-CYCLONE DUST SEPARATING APPARATUS

CROSS-REFERENCE TO RELATED APPLICATIONS

This application claims the benefit of U.S. provisional application No. 60/725,815, filed Oct. 12, 2005, in the United States Patent & Trademark Office, and claims the benefit of Korean Patent Application No. 2005-102612, filed Oct. 28, 2005, in the Korean Intellectual Property Office, the disclosure of both of which are incorporated herein by reference.

BACKGROUND OF THE INVENTION

1. Field of the Invention

The present invention relates to a vacuum cleaner. More particularly, the present invention relates to a multi-cyclone dust separating apparatus employed in a vacuum cleaner to centrifuge dirty substances drawn into the vacuum cleaner by two stages.

2. Description of the Related Art

Generally, a vacuum cleaner includes a bottom brush drawing dust-laden air from a surface being cleaned, a motor driving chamber having a vacuum generator, and a vacuum cleaner body having a cyclone dust separating apparatus.

A cyclone dust separating apparatus is constructed such that it separates and collects dust by generating a whirling current from the air being drawn from the bottom brush, and discharges clean air to the motor driving chamber. Recently introduced multi-cyclone dust separating apparatus aims to increase dust collecting efficiency, by employing first and second cyclones to filter dust from the air by at least two stages, and in this construction, one or more second cyclones are usually employed.

Related art can be found in WO02/067755 and WO02/067756 to Dyson Ltd. In these examples, upstream cyclone as the first cyclone and downstream cyclone as the second cyclone are arranged in a vertical manner, and thus usually employed in upright type vacuum cleaners, but hardly applicable in canister type cleaners.

The same applicant has disclosed a multi-cyclone dust separating apparatus in Korean Patent Application 2003-62520 in which the first cyclone is nested in the second cyclone to decrease overall height of the cyclones. However, the applicant has now noted that demand still remains for more compact-sized vacuum cleaners, especially for home use.

Another need was found in the fact that the cyclone dust separating apparatuses are usually in fixed size and thus compacter vacuum cleaner has lower dust collecting capacity. Because the cleaners with lower dust collecting capacity are filled with dust sooner than others, it needs be replaced frequently. Therefore, a way to improve dust collecting capacity of cyclones of fixed size, is necessary.

SUMMARY OF THE INVENTION

The present invention has been made to overcome the above-mentioned problems of the art, and therefore, it is an object of the present invention to provide a multi-cyclone dust separating apparatus that has cyclone devices of decreased height such that it is compact in size and easily applicable not only to the upright type vacuum cleaners, but also to the canister type cleaners.

It is another object of the present invention to provide a multi-cyclone dust separating apparatus, which is compact in size, but has maximum dust collecting capacity in the limited structure.

The above aspects and/or other features of the present invention can substantially be achieved by providing a multi-cyclone dust separating apparatus comprising a main cyclone part comprising one or more cyclones, a sub cyclone part comprising one or more cyclone cones, and arranged in substantially parallel relation with respect to the main cyclone part, and a dust collecting casing provided to surround the main cyclone part and the sub cyclone part, and comprising a dust collecting chamber where dust separated in the main cyclone part and the sub cyclone part is collected. The dust collecting casing has a non-constant radius on the same height from the bottom.

The dust collecting casing comprises a first wall, and a second wall having a radius longer than the first wall.

The sub cyclone part comprises one or more cyclone cones arranged along the inner circumference of the dust collecting casing to surround a part of the main cyclone part, and having a diameter gradually decreased toward the upper end.

The cyclone cones are not arranged along the inner circumference of the second wall.

The dust collecting casing comprises a first dust collecting chamber to collect dust, which is separated in the main cyclone part, and a second dust collecting chamber to collect dust, which is separated in the sub cyclone part. The partition is disposed between the main cyclone part and the cyclone cones.

The second wall is formed of a transparent material.

The second wall comprises a protruding part, which corresponds to approximately the span of a hand in width i.e., about nine inches. The protruding part may have a width smaller than about nine inches.

The center axis of whirling air current of the cyclone cones is not parallel with the center axis of whirling air current of the main cyclone part.

The cyclone cones are arranged such that toward the upper end, the main axis of whirling air current gets farther away from the center axis of whirling air current of the main cyclone part.

A guide cover is further provided for connecting to the lower end of the dust collecting casing, to guide an air, which is discharged from the main cyclone part, to the sub cyclone part.

An upper cover is further provided for removably connecting to the upper end of the dust collecting casing, to form a dust discharge port in cooperation with the upper end of the main cyclone part.

According to one aspect of the present invention, a multi-cyclone dust separating apparatus comprises a main cyclone part for separating by centrifugal force dust from an externally drawn air, and comprising one or more cyclones, a sub cyclone part comprising a plurality of cyclone cones for separating by centrifugal force minute particles of the dust from the air drawn from the main cyclone part, and a dust collecting casing provided to surround the main cyclone part and the sub cyclone part, and comprising a dust collecting chamber where dust separated in the main cyclone part and the sub cyclone part is collected. The dust collecting casing comprises a first wall of a predetermined radius, having a cut part, and a second wall connected at its both ends with the first wall, and protruding away from the center of radius of the first wall.

The second wall has a width smaller than the span of a hand, i.e., about nine inches, so that a user can easily grab the second wall.

The second wall is formed of a transparent material.

The plurality of cyclone cones are not arranged along the inner circumference of the second wall.

The dust collecting casing comprises a partition, which is formed between the main cyclone part and the plurality of cyclone cones to divide the dust collecting chamber into a first dust collecting chamber where the dust separated in the main cyclone part is collected, and a second dust collecting chamber where minute particles of the dust separated in the plurality of cyclone cones is collected.

BRIEF DESCRIPTION OF THE DRAWINGS

The above aspects and features of the present invention will be more apparent by describing certain embodiments of the present invention with reference to the accompanying drawings, in which.

DETAILED DESCRIPTION OF THE EXEMPLARY EMBODIMENTS

Figure 1:
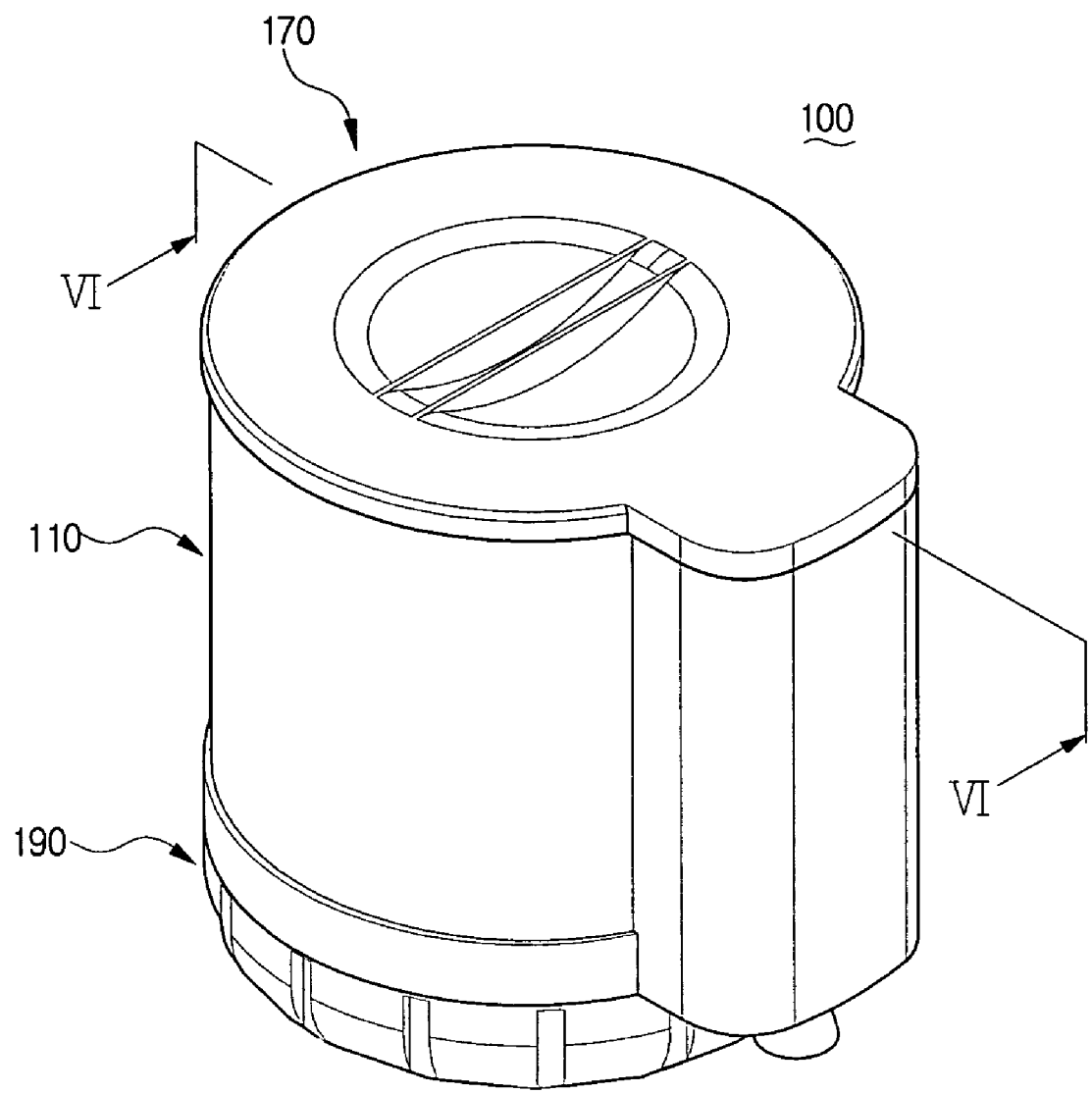
FIG. 1 is a perspective view of a multi-cyclone dust separating apparatus according to an embodiment of the present invention.

Certain embodiments of the present invention will be described in greater detail with reference to the accompanying drawings.

In the following description, same drawing reference numerals are used for the same elements even in different drawings. The matters defined in the description such as a detailed construction and elements are nothing but the ones provided to assist in a comprehensive understanding of the invention. Thus, it is apparent that the present invention can be carried out without those defined matters. Also, well-known functions or constructions are not described in detail since they would obscure the invention in unnecessary detail.

Figure 2:
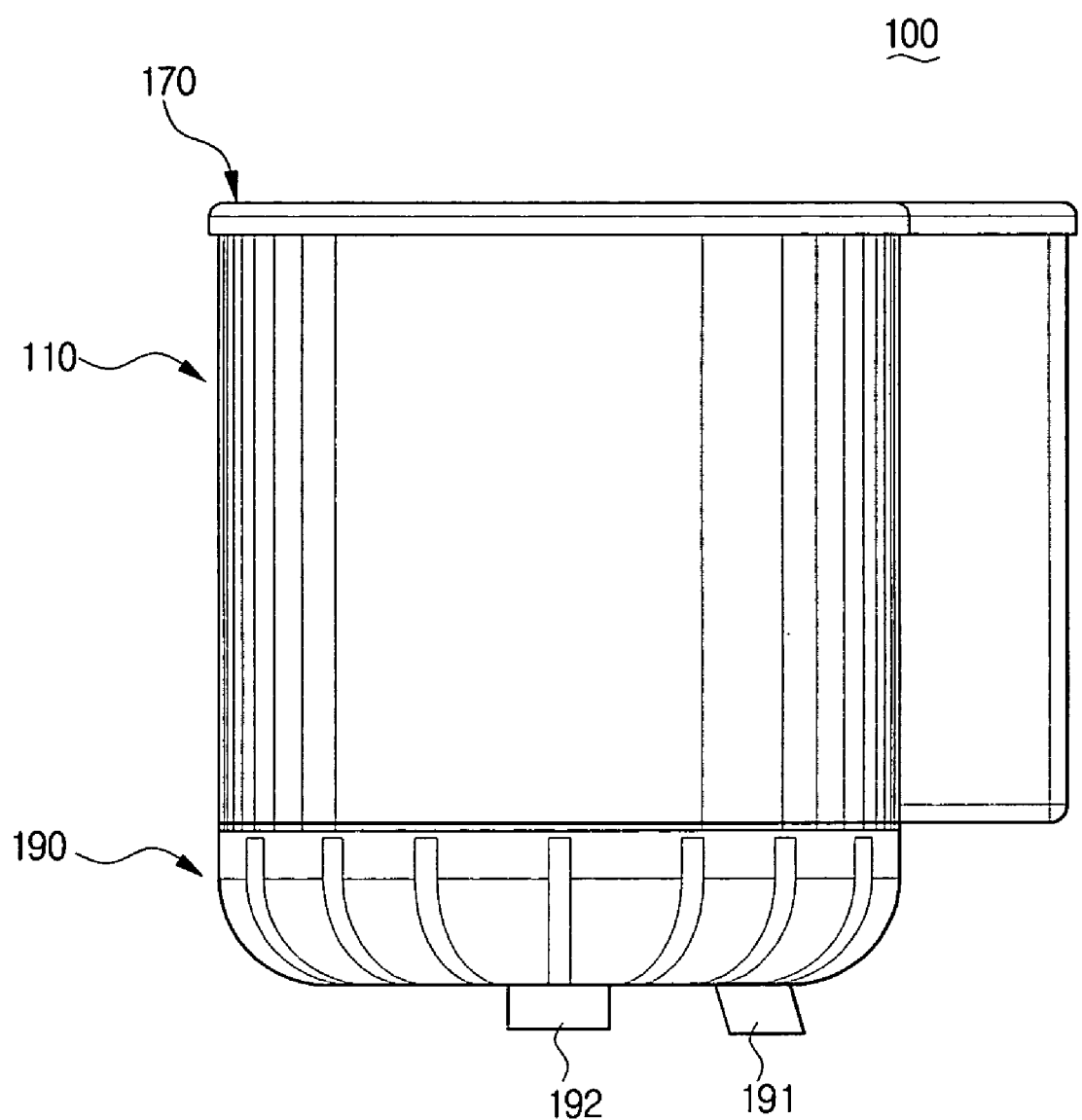
FIG. 2 is a side view of the multi-cyclone dust separating apparatus of FIG. 1.

Referring to FIGS. 1 and 2, a multi-cyclone dust separating apparatus 100 includes a cyclone unit 110, an upper cover 170, and a discharge cover 190.

Air is drawn into the cyclone unit 110 through an air inlet port 191. The air inlet port 191 is in fluid communication with a suction brush (not shown) that draws in dust-laden air from a surface being cleaned. Dust is separated from the drawn air and collected in the cyclone unit 110, and the clean air is discharged from the cyclone unit 100 and exhausted out of the multi-cyclone dust separating apparatus 100 through an air discharge port 192. The air discharge port 192 is in fluid communication with the motor driving chamber (not shown) that has the vacuum generator.

Figure 3:
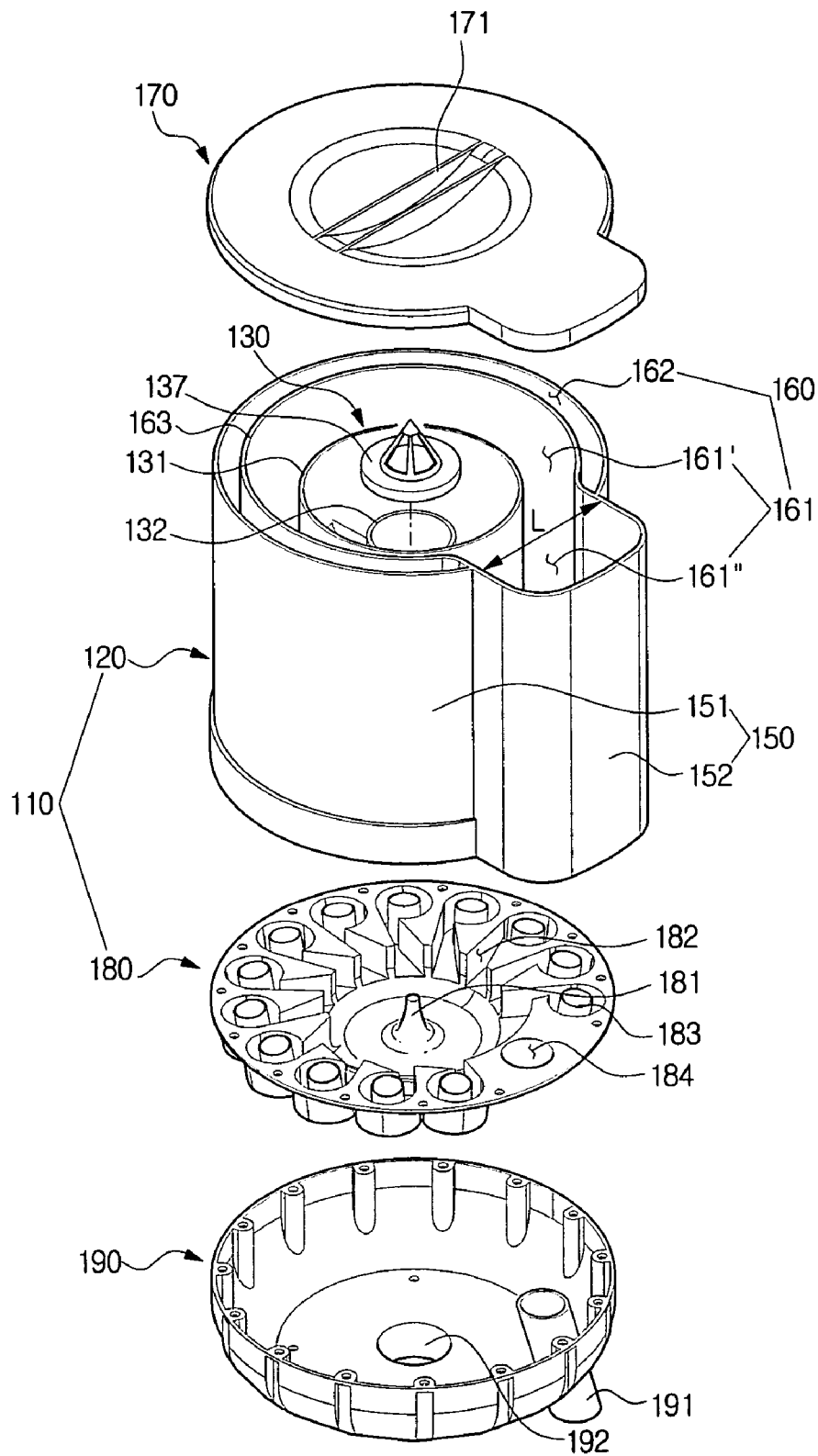
FIG. 3 is an exploded perspective view of the multi-cyclone dust separating apparatus of FIG. 1.
Figure 4:
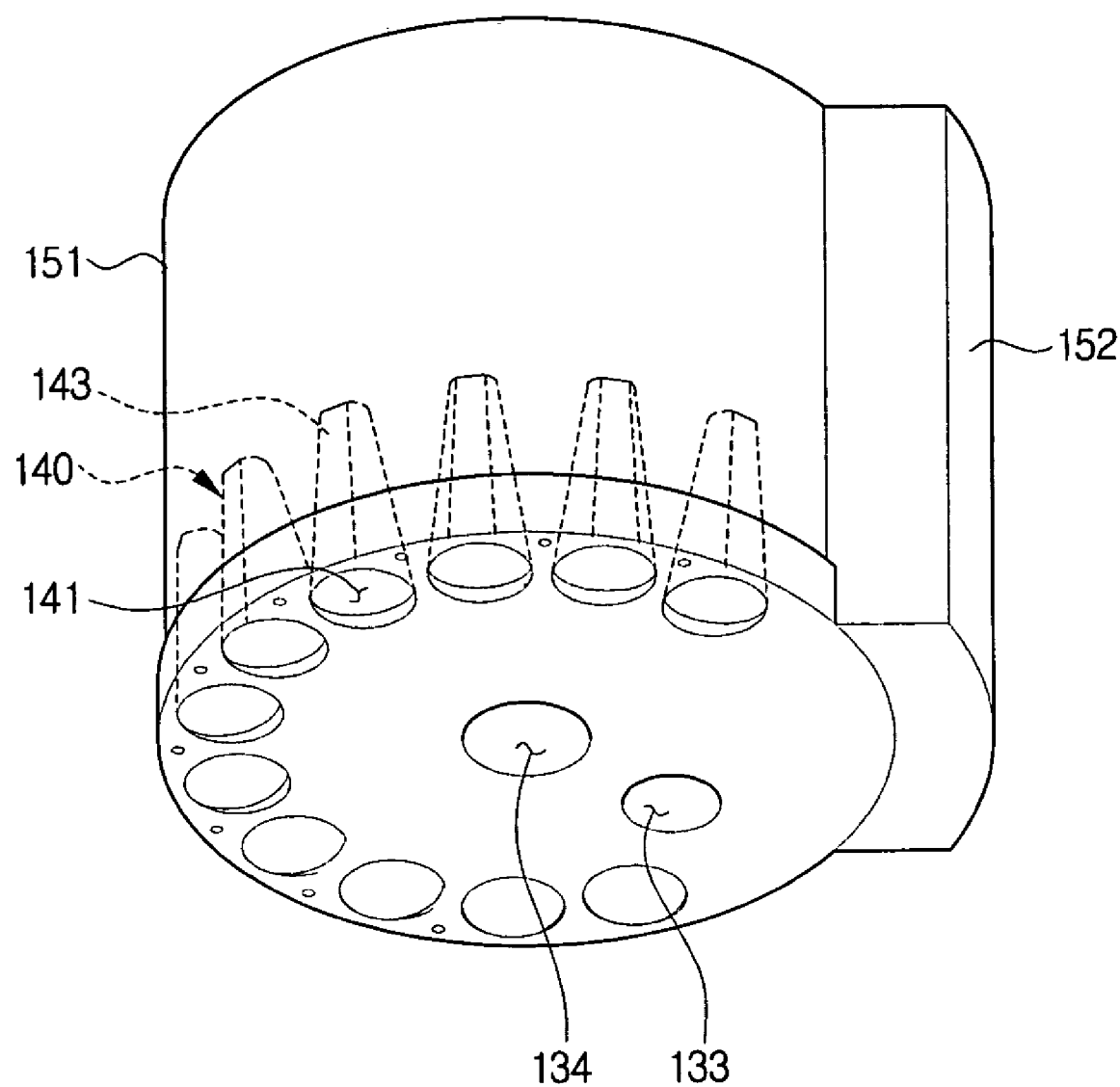
FIG. 4 is a bottom view of the cyclone body of FIG. 3.

Referring to FIGS. 3 and 4, the cyclone unit 110 includes a cyclone body 120 and a guide cover 180. The cyclone body 120 includes a main cyclone part 130, a sub cyclone part having at least one cyclone cone 140, and a dust collecting casing 150.

The main cyclone part 130 performs a first dust separating process, thus it separates by centrifugal force the dust from the air drawn through the air inlet port 191. Accordingly, most of the dust, especially large particles of the dust, are filtered out in the main cyclone part 130. The cyclone cone 140 performs a second dust separating process with respect to the air incoming from the main cyclone part 130. By the second dust separating process, minute particles of the dust, which are too minute to be separated in the first process, are filtered out. The dust collecting casing 150 forms an outer part of the cyclone body 120, and includes the main cyclone part 130 and a dust collecting chamber 160 where the dust is collected after being separated in the cyclone cone 140.

The main cyclone part 130 includes an air inlet 133, an air outlet 134, and a chamber wall 131, which defines the main cyclone chamber therein.

As shown, the main cyclone part 130 has the main air inlet 133 and the main air outlet 134 at the bottom part. The chamber wall 131 is formed in a substantially cylindrical manner to form dust-laden air into whirling current, and has a height slightly lower than the dust collecting casing 150. An air discharge pipe 132 is installed approximately at the center of the space defined by the chamber wall 131, and formed to a predetermined height. The lower end of the air discharge pipe 132 is in fluid communication with the air discharge port 134. A grill member 137 is provided at the upper end of the air discharge pipe 132 to filter dust from the air. An air guiding member 135 (see FIG. 6) is upwardly inclined and continuously formed in a predetermined length in a spiral fashion along the outer side of the air discharge pipe 132 and inner side of the chamber wall 131 so that drawn air can turn in an upward current. Accordingly, air is drawn through the air inlet 133, guided along the air guiding member 135, and rises in a whirling air current. In this process, air is separated from the dust inside the chamber wall 131 so that clean air passes through the air discharge pipe 132 and is discharged through the air discharge port 134.

As shown, the air inlet 133 and the air outlet 134 are formed side by side on the bottom side of the main cyclone part 130. That is, the air inlet 133 and the air outlet 134 are formed on the substantially same plane. According to one embodiment of the present invention, the main cyclone part 130 is structured such that air is drawn in and discharged out through the bottom end thereof.

Although this particular embodiment employs one cyclone as the main cyclone part 130, one will understand that this will not be construed as limiting. For example, two cyclones may well be employed as the main cyclone part 130.

The cyclone cone 140 is arranged around the lower part of the chamber wall 131 of the main cyclone part 130. In the illustrated embodiment, the sub cyclone part includes a plurality of cyclone cones 140 arranged in a letter 'C' pattern around the lower part of the chamber wall 131 of the main cyclone part 130. More particularly, the sub cyclone part does not include the cyclone cone 140 on certain part of the circumference of the main cyclone part 130 so that a second wall 152 of the dust collecting casing 150 can be formed thereon. This will be explained in detail below.

The main cyclone part 130 has the discharge structure at the lower part, and in order to minimize path of air, the cyclone cone 140 also has an air drawing structure at the lower end. Accordingly, a cone inlet 141 of the cyclone cone 140 is arranged at the lower end of the cyclone cone 140. As shown, the air outlet 134 of the main cyclone part 130 and the cone inlet 141 of the cyclone cone 140 are arranged on the substantially same plane. By doing so, the path of air is minimized, and thus, loss of suction force can be minimized.

Figure 6:
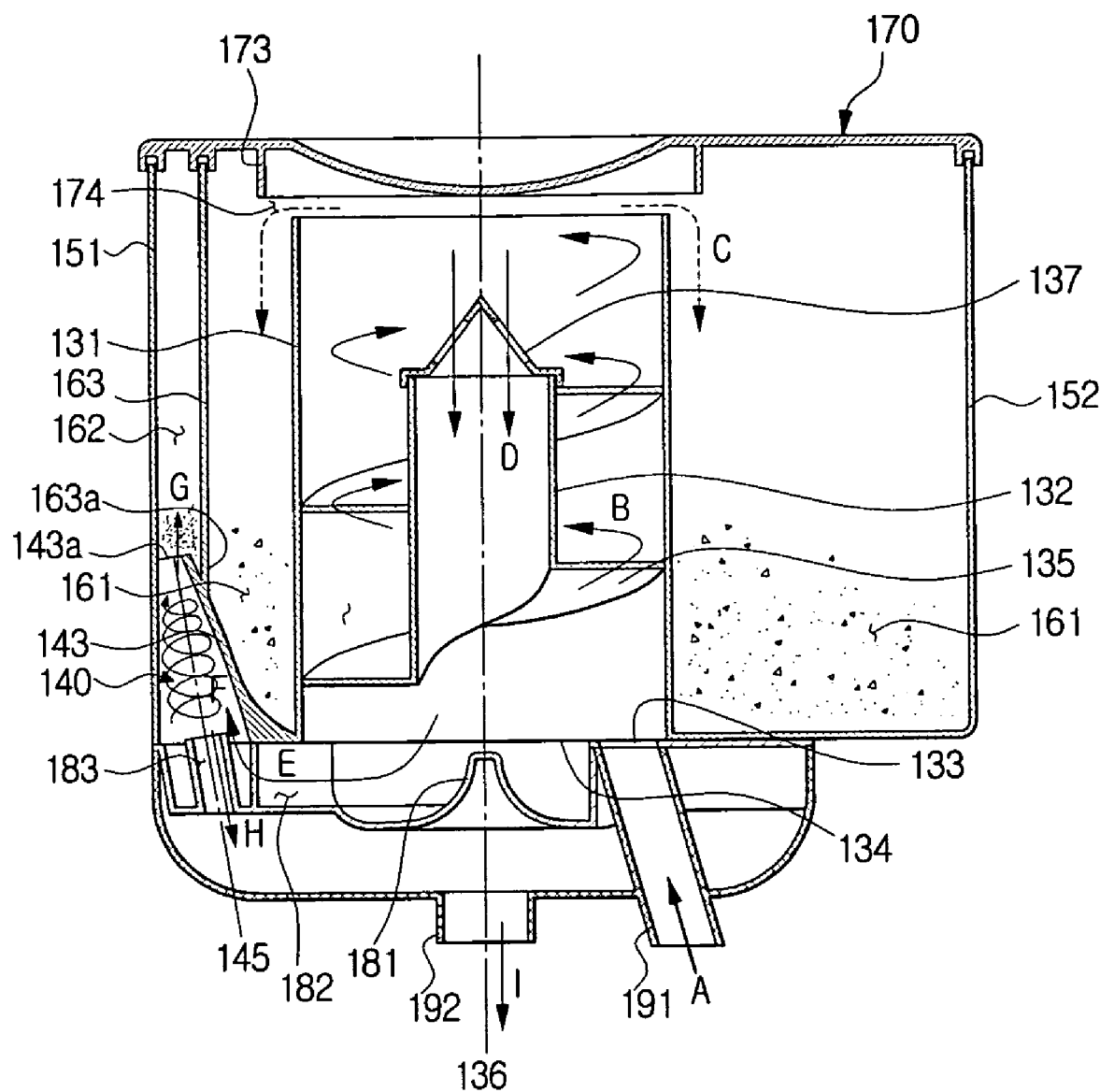
FIG. 6 is a sectional view taken on line VI-VI of FIG. 1.

The cyclone cone 140 is formed in a substantially conical structure and thus, it has gradually narrowing diameter toward the upper end 143a of the body 143. The cyclone cone 140 is open at both upper and lower ends. The cone inlet 141 is formed on the lower end of the cyclone cone 140, and dust separated from the air inside the cyclone cone 140 is discharged through the upper end. Referring to FIG. 6, the cyclone cone 140 is formed such that toward the upper end 143a, it inclines closer to the first wall 151 of the dust collecting casing 150. In other words, toward the upper end 143a of the cyclone cone 140, the center axis of the cyclone cone 140 is located farther from the center axis 136 of the whirling air of the main cyclone part 130. As a result, the volume of the first dust collecting chamber 161 advantageously increases.

The dust collecting casing 150 is arranged to surround the main cyclone part 130 and a plurality of cyclone cones 140, and forms the dust collecting chamber 160 in cooperation with the main cyclone part 130. Thus, dust separated in the cyclone cones 140 is collected in the dust collecting chamber 160. The dust collecting casing 150 has a non-constant radius on the same height from the bottom. In this particular embodiment, the dust collecting casing 150 may have a first wall 151 of a predetermined radius that has a cut part, and a second wall 152 of a larger radius than the first wall 151 and protruding from the first wall 151. The second wall 152 may have a variety of configurations. For example, the second wall 152 may have a half-circular, or approximately square configurations. The second wall 152 protrudes from the first wall 151 to have longer radius than the first wall 151 from the central axis. Two ends of the second wall 152 are connected with the first wall 151. The first wall 151 and the second wall 152 may be formed integrally with each other for the sake of convenience in manufacturing and assembly.

The first wall 151 is formed to surround a plurality of cyclone cones 140. The cyclone cones 140 are formed only along the inner circumference of the first wall 151, and thus, there is no cyclone cone 140 along the inner circumference of the second wall 152.

The second wall 152 is a protruding part, which has a width L that corresponds to approximately the span of a hand in width i.e., about nine inches. In some embodiments, the width L of the second wall 152 may be shorter than about nine inches. Accordingly, the second wall 152 may also be used as a handle by which the user can hold with ease. By doing as the above, a handle on the dust collecting casing 150 is not necessary, and therefore, advantageous such as easier manufacturing and cheaper manufacturing price can be provided.

The dust collecting casing 150 has a partition 163 that separates inner dust collecting chamber 160 into a first dust collecting chamber 161 for collecting dust, which is separated in the main cyclone part 130, and a second dust collecting chamber 162 for collecting dust, which is separated in a plurality of cyclone cones 140. Therefore, the first dust collecting chamber 161 includes a space 161' between the chamber wall 131 and the partition 163, and another space 161" between the chamber wall 131 and the second wall 152. The second dust collecting chamber 162 is formed by the space between the partition 163 and the first wall 151. Both ends of the partition 163 are partially bent to connect to both ends of the first wall 151. The partition 163 is formed between the main cyclone part 310 and the cyclone cones 140. The lower end 163a of the partition 163 is partially connected to the body 143 of the cyclone cones 140 (see FIG. 6). Accordingly, the partition 163 is also not formed on the inner circumference of the second wall 152. Accordingly, the first wall 151 and the partition 163 are formed in a letter 'C' fashion to correspond to the 'C' formation of the cyclone cones 140.

Due to the presence of the second wall 152 that is protruding, the volume of the first dust collecting chamber 161 increases. Because the volume of the first dust collecting chamber 161 is larger than having a cylindrical dust collecting casing 150, dust collecting capacity of the first dust collecting chamber 161 can be maximized. Relatively large particles, and most of dust are separated in the main cyclone part 130, while the minute particles, which are too fine to be filtered at the main cyclone part 130, are separated in the cyclone cones 140. Because dust is fast collected in the first dust collecting chamber 161, it is preferred that the capacity of the first dust collecting chamber 161 be increased as compared to that of the second dust collecting chamber 162.

Figure 5:
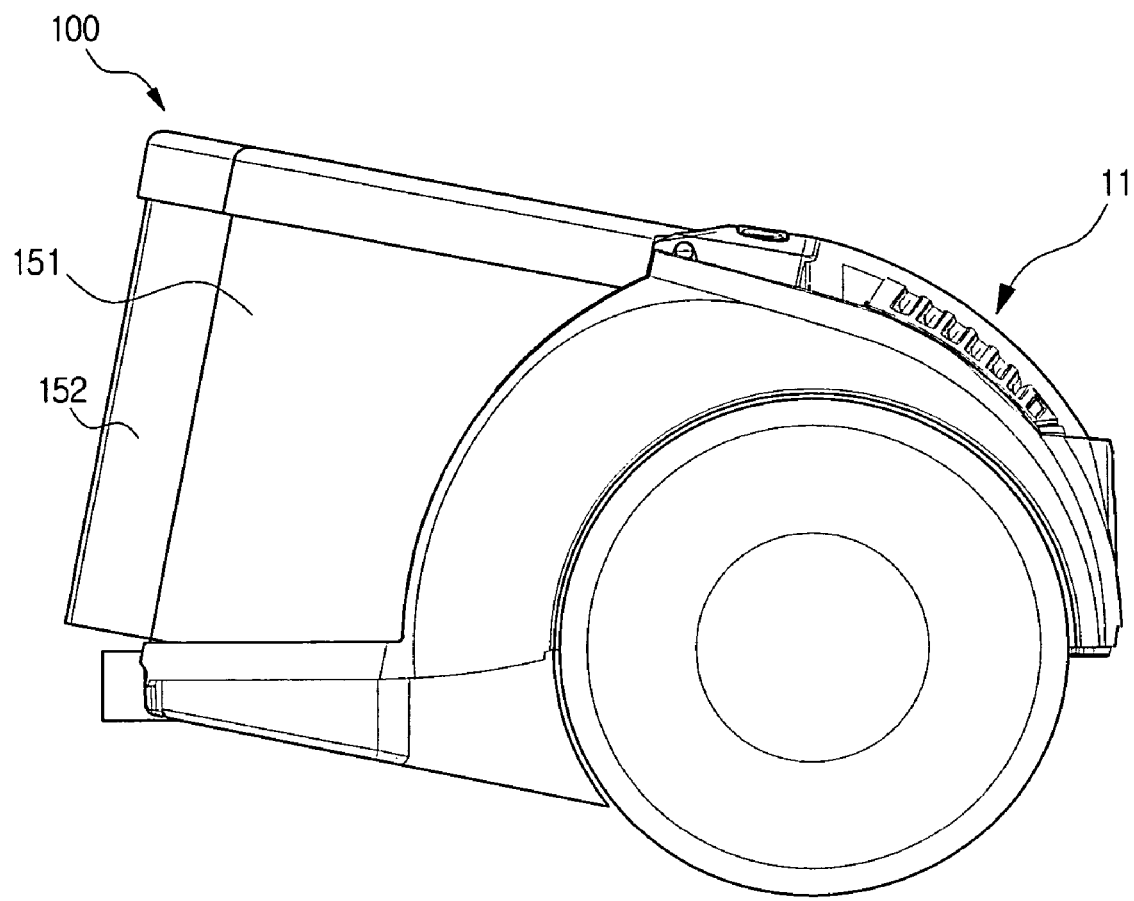
FIG. 5 is a side view of a vacuum cleaner body employing a multi-cyclone dust separating apparatus according to an embodiment of the present invention.

Referring to FIG. 5, when the multi-cyclone dust separating apparatus 100 according to one aspect of the present invention is mounted on the main body 11 of the cleaner, the second wall 152 of the dust collecting casing 150 is exposed to the outside. In other words, only the part corresponding to the first wall 151 of the dust collecting casing 150 is mounted, while the second wall 152 is exposed out through the main body 11 of the vacuum cleaner. According to one aspect of the present invention, dust collecting capacity of the first dust collecting chamber 151 is increased, without having to enlarge the main body 11 of the cleaner or increase the overall height of the cyclone dust separating apparatus.

Through the second wall 152, a user of the cleaner may check the amount of dust collected in the first dust collecting chamber 161. Therefore, it is preferable to form the second wall 152 with a transparent material so that the user can see therethrough. As described above, dust is rapidly gathered in the first dust collecting chamber 161. Accordingly, without having to separate the multi-cyclone dust separating apparatus 100 from the main body 11 of the vacuum cleaner, the user can frequently check whether the dust collecting chamber 161 is filled or not. When the first and the second walls 151 and 152 are formed integrally with each other, both are formed of a transparent material. However, the user's view of the first dust collecting chamber 161 within the first wall 151 is obstructed due to the presence of the cyclone cones 140.

When completing cleaning operation and determining that dust should be dumped or repair is necessary, the user may grab the second wall 152 and separate the multi-cyclone dust separating apparatus 100 from the main body 11 of the vacuum cleaner.

Referring back to FIG. 3, a guide cover 180 is coupled to the lower end of the cyclone body 120, and includes a guide cone 181, an incoming flow guide path 182 and outgoing flow guide path 183. The guide cone 181 radially distributes the air as it is discharged from the air outlet 134 of the main cyclone part 130. The incoming flow guide path 182 guides the radially distributed air such that air is flowed into the cyclone cones 140 (see FIG. 4) in a whirling current. The outgoing flow guide path 183 has a tubular configuration, with its upper end partially inserted in the cyclone cone 140 to guide dust-free air from the cyclone cone 140 to be discharged. In other words, the outgoing flow guide path 183 operates as an air discharge port of the cyclone cone 140. Meanwhile, an air communicating port 184 is formed in the guide cover 180, in fluid communication with the air inlet 133 (see FIG. 4) of the main cyclone part 130 and the air inlet port 191 of the discharge cover 190. Accordingly, external air is drawn into the main cyclone part 130 subsequently via the air inlet port 191, the air communicating port 184 and the air inlet 133.

Referring to FIGS. 3 and 6, the upper cover 170 is removably connected to the upper end of the cyclone body 120. Accordingly, the user only needs to separate the upper cover 170 to empty the cyclone body 120. A handle 171 may be formed on the upper side of the upper cover 170 for the convenience of the user. The upper cover 170 forms a dust discharge port 174 in cooperation with the upper end of the chamber wall 131, upon mounting to the cyclone body 120.

Dust separated in the main cyclone part 130 is discharged through the dust discharge port 174 to be piled in the first dust collecting chamber 161. There is a backflow preventive member 173 formed substantially in a circular configuration on the lower side of the upper cover 170 to prevent dust from flowing back into the chamber wall 131 once the dust is piled in the first dust collecting chamber 161. The backflow preventive member 173 has a diameter longer than that of the chamber wall 131.

Referring to FIG. 3, the discharge cover 190 includes the air inlet port 191 through which dust-laden air is drawn into the cyclone unit 110, and the air discharge port 192 through which dust-free air is discharged from the cyclone unit 110.

According to one embodiment of the present invention as explained above, a plurality of cyclone cones 140 are arranged around the lower end of the main cyclone part 130, and the first and the second dust collecting chambers 161 and 162 are arranged in parallel relation with the main cyclone part 130 and the cyclone cones 140. As a result, overall height is reduced, and thus, a multi-cyclone dust separating apparatus 100 in compacter size can be provided. Additionally, by forming the second wall 152 to protrude from the dust collecting casing 150, the inner space of the first dust collecting chamber 161 is increased and as a result, dust collecting efficiency improves. Additionally, because the second wall 152 operates also as a handle, the convenience is provided in manufacturing and manufacturing cost reduces.

Referring now to FIG. 6, the operation of the multi-cyclone dust separating apparatus 100 according to an embodiment of the present invention will be described.

With the power on, the vacuum generator of the vacuum cleaner generates vacuum, and thus, the suction force is generated. Dust-laden air is drawn into the multi-cyclone dust separating apparatus 100 by the suction force. More specifically, dust-laden air is drawn into the main cyclone part 130 through the air inlet port 191 and the air inlet 133 in arrow 'A' direction, guided in arrow 'B' direction by the air guide member 135 to thus rise in an upward whirling current. At this time, dust in the air is drawn outward toward the inner side of the chamber wall 131 due to the centrifugal force, lifted in the upward air current, and propelled out through the dust discharge port 174 and piled in the first dust collecting chamber 161 as indicated by arrow 'C' direction. Meanwhile, upward whirling air current 'B' collides against the upper cover 170 and descends in the direction indicated as arrow 'D', and thus flows through the grill member 137 and the air discharge pipe 132 and discharged through the air discharge port 134.

After being discharged, the descending air 'D' is radially guided, and drawn into the cyclone cones 140 through the respective guide paths 182 as indicated by arrow 'E'. The guided air 'E' then rises in a second whirling current in each cyclone cone 140 as indicated by arrow 'F'. At this time, dust of the air is drawn toward outward the inner side of the cyclone cone 140 due to the centrifugal force, lifted in the upward current as indicated by arrow 'G', discharged through the upper end 143a and piled in the second dust collecting chamber 162. After dust is removed, clean air descends and is discharged out of the cyclone cone 140 through the discharge guide path 183 as indicated in arrow 'H'. When the air is discharged from the cyclone cones 140, the discharged air 'H' is gathered in the inner space of the discharge cover 190, and discharged out through the air discharge port 192 as indicated by arrow 'I'.

As explained above in a few exemplary embodiments of the present invention, one or more cyclone cones 140 are arranged around the lower end of the main cyclone part 130, and the dust collecting chamber 160 is arranged in parallel relation with respect to the main cyclone part 130 and the one or more cyclone cones 140. Accordingly, overall height is reduced, and a compacter multi-cyclone dust separating apparatus can be provided.

Additionally, because the space of the first dust collecting chamber is increased by extending a part of the dust collecting casing 150 to protrude out, dust collecting capacity increases. Additionally, by forming the protruding part with a transparent material, the amount of gathered dust can be easily checked without having to separate multi-cyclone dust collecting apparatus from the main body of the cleaner.

Additionally, the protruding part may operate also as a handle, which provides convenience in manufacturing and reduction of manufacturing cost.

The foregoing embodiments and advantages are merely exemplary and are not to be construed as limiting the present invention. The present teaching can be readily applied to other types of apparatuses. Also, the description of the embodiments of the present invention is intended to be illustrative, and not to limit the scope of the claims, and many alternatives, modifications, and variations will be apparent to those skilled in the art.

What is claimed is:

1. A multi-cyclone dust separating apparatus, comprising:
a main cyclone part comprising one or more cyclones;
a sub cyclone part comprising one or more cyclone cones, and the sub cyclone part being arranged in substantially parallel relation with respect to the main cyclone part; and
a dust collecting casing provided to surround the main cyclone part and the sub cyclone part, and comprising a dust collecting chamber where dust separated in the main cyclone part and the sub cyclone part is collected, wherein the dust collecting casing has a non-constant radius on the same height from the bottom, wherein the one or more cyclone cones are arranged along an inner circumference of the dust collecting casing to surround a lower part of the main cyclone part, wherein each of the one or more cyclone cones has a diameter that gradually decreases toward an upper end, and wherein air is discharged from the lower part of the main cyclone part, is drawn into a lower part of the sub cyclone part so as to separate fine dust from the air, and is discharged from the lower part of the sub cyclone part.

2. The multi-cyclone dust separating apparatus of claim 1, wherein the dust collecting casing comprises a first wall and a second wall, the second wall having a radius longer than the first wall.

3. The multi-cyclone dust separating apparatus of claim 2, wherein the one or more cyclone cones are not arranged along the inner circumference of the second wall.

4. The multi-cyclone dust separating apparatus of claim 3, wherein the dust collecting casing comprises a first dust collecting chamber to collect dust that is separated in the main cyclone part, and a second dust collecting chamber to collect dust that is separated in the sub cyclone part.

5. The multi-cyclone dust separating apparatus of claim 4, further comprising a partition disposed between the main cyclone part and the one or more cyclone cones.

6. The multi-cyclone dust separating apparatus of claim 1, wherein the one or more cyclone cones generate a whirling air current having a center axis that is not parallel with a center axis of whirling air current of the main cyclone part.

7. The multi-cyclone dust separating apparatus of claim 2, wherein the second wall is formed of a transparent material.

8. The multi-cyclone dust separating apparatus of claim 2, wherein the second wall comprises a protruding part that has a width of about nine inches.

9. The multi-cyclone dust separating apparatus of claim 8, wherein the width is smaller than about nine inches.

10. The multi-cyclone dust separating apparatus of claim 9, wherein the one or more cyclone cones are arranged such that toward the upper end, a center axis of whirling air current gets farther away from a center axis of whirling air current of the main cyclone part.

11. The multi-cyclone dust separating apparatus of claim 1, further comprising a guide cover for connecting to a lower end of the dust collecting casing, to guide an air, which is discharged from the main cyclone part, to the sub cyclone part.

12. The multi-cyclone dust separating apparatus of claim 11, further comprising an upper cover for removably connecting to an upper end of the dust collecting casing, to form a dust discharge port in cooperation with an upper end of the main cyclone part.

13. A multi-cyclone dust separating apparatus comprising:
a main cyclone part for separating by centrifugal force dust from an externally drawn air, the main cyclone part comprising one or more cyclones;
a sub cyclone part comprising a plurality of cyclone cones for separating by centrifugal force minute particles of the dust from the air drawn from the main cyclone part; and
a dust collecting casing provided to surround the main cyclone part and the sub cyclone part, the dust collecting casing comprising a dust collecting chamber where dust separated in the main cyclone part and the sub cyclone part is collected, the dust collecting casing comprising:
a first wall of a predetermined radius and having a cut part, and
a second wall connected at its both ends with the first wall, the second wall protruding away from a center of radius of the first wall, wherein the plurality of cyclone cones are arranged along an inner circumference of the dust collecting casing to surround a lower part of the main cyclone part, wherein each of the plurality of cyclone cones has a diameter that gradually decreases toward an upper end, and wherein air is discharged from the lower part of the main cyclone part, is drawn into a lower part of the sub cyclone part so as to separate fine dust from the air, and is discharged from the lower part of the sub cyclone part.

14. The multi-cyclone dust separating apparatus of claim 13, wherein the second wall has a width smaller than about nine inches.

15. The multi-cyclone dust separating apparatus of claim 14, wherein the second wall is formed of a transparent material.

16. The multi-cyclone dust separating apparatus of claim 13, wherein the plurality of cyclone cones are not arranged along an inner circumference of the second wall.

17. The multi-cyclone dust separating apparatus of claim 16, wherein the dust collecting casing comprises a partition which is formed between the main cyclone part and the plurality of cyclone cones to divide the dust collecting chamber into a first dust collecting chamber where the dust separated in the main cyclone part is collected, and a second dust collecting chamber where minute particles of the dust separated in the plurality of cyclone cones is collected.

* * * * *